(No Model.)
J. P. MUTTERSBACH.
TWO WHEELED VEHICLE.
No. 285,153. Patented Sept. 18, 1883.
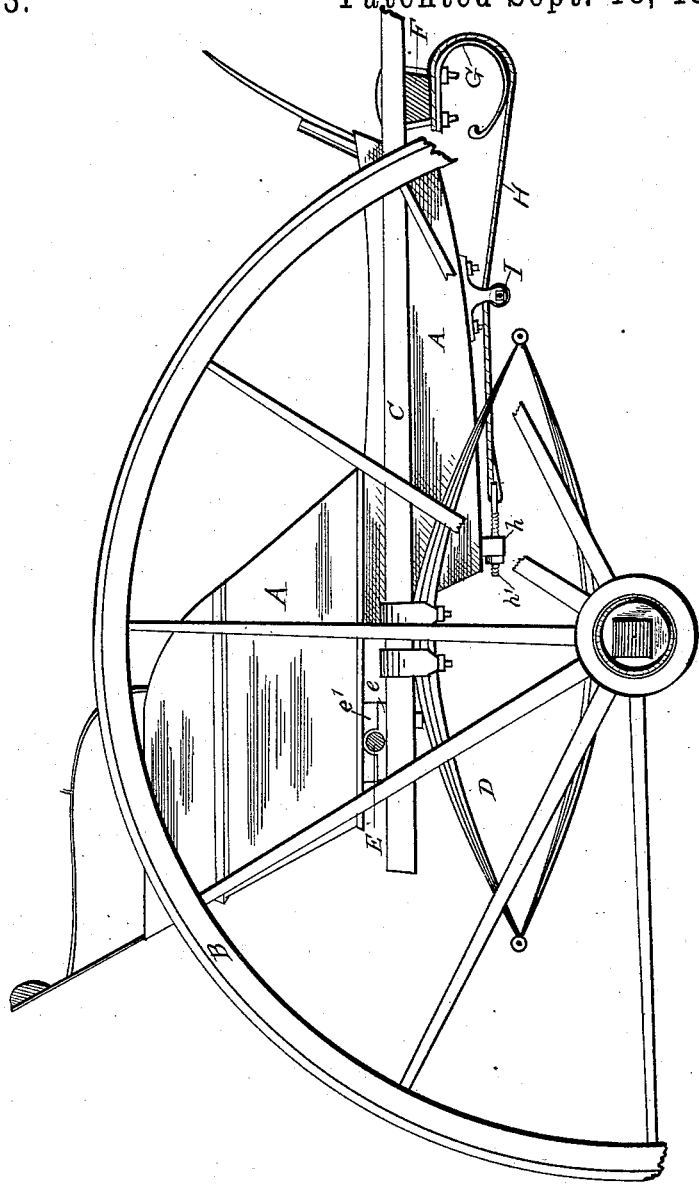
Witnesses.
Elihu P. Stowe.
Alfred B. Treadwell.
Inventor.
John P. Muttersbach.
By Joshua B. Webster Atty.

UNITED STATES PATENT OFFICE.

JOHN P. MUTTERSBACH, OF HICKSVILLE, CALIFORNIA.

TWO-WHEELED VEHICLE.

SPECIFICATION forming part of Letters Patent No. 285,153, dated September 18, 1883.

Application filed March 17, 1883. (No model.)

*To all whom it may concern:*

Be it known that I, JOHN P. MUTTERSBACH, a citizen of Denmark, residing at Hicksville, in the county of Sacramento and State of California, have invented certain new and useful Improvements in Two-Wheeled Vehicles; and I do declare the following to be a full, clear, and exact description of the invention, such as will enable others skilled in the art to which it appertains to make and use the same, reference being had to the accompanying drawing, and to the letters and figures of reference marked thereon, which forms a part of this specification.

The figure is a side elevation, partly in section, of my improved two-wheeled vehicle.

Similar letters of reference indicate corresponding parts.

The object of my invention is to furnish a two-wheeled vehicle that shall be simple in construction and convenient in use, being very easy and comfortable even in fast driving over rough roads, and inexpensive to repair.

A is the body. B are the wheels. C are the shafts. D are the side springs. At the rear of the shafts C is a cross-rod, E, having its ends fastened solid, by iron straps $e$, to the shafts C, and passing through blocks $e'$ on each side of the body A, so as to permit a hinge-like movement of the body A when in motion. F is a cross-brace, connecting the shafts C in front of the body A. On each side of the brace F, beneath it, are bolted C-shaped springs G, having their fronts facing the vehicle. Leather straps H—one to each spring G—are also attached to brace F, and, passing around the backs of springs G, extend rearward over rollers I, fastened beneath the body A, and are secured by bolts $h'$, passing through block $h$, attached to and beneath the body A at each corner of its rear. By screwing up the nuts of bolts $h'$ the straps H may be slackened or tightened as required. The shafts C are attached to side springs, D, at their center tops by clips, and the springs D to the axle in the same manner.

It will readily be seen that the attachment above described of the vehicle-body A to the shafts C is simple and inexpensive, and furnishes a very easy-riding vehicle.

Having thus described my invention, what I claim as new, and desire to secure by Letters Patent, is—

1. The vehicle-body A, secured to the shafts by the cross-rod E at its rear, and at its front by the straps H, passing over the back of springs G, secured to brace F, said straps H passing through roller I, secured beneath body A, and having their rear ends attached by bolts $h'$ to block $h$, beneath body A, as shown and described.

2. The combination, with the springs G, attached to brace F, and the blocks $e'$, attached beneath the rear of body A, of the leather straps H, passing over rollers I, attached beneath body A, and having at their rear ends the bolts $h'$, inserted through blocks $h$, substantially as and for the purposes described and herein set forth.

In testimony whereof I affix my signature in presence of two witnesses.

JOHN P. MUTTERSBACH.

Witnesses:
JOSHUA B. WEBSTER,
ELIHU B. STOWE.